(12) United States Patent
Luo

(10) Patent No.: US 12,189,698 B2
(45) Date of Patent: Jan. 7, 2025

(54) CONTENT CREATION METHOD AND DEVICE

(71) Applicant: Beijing Bytedance Network Technology Co., Ltd., Beijing (CN)

(72) Inventor: Zhili Luo, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 3 days.

(21) Appl. No.: 17/787,924

(22) PCT Filed: Apr. 30, 2021

(86) PCT No.: PCT/CN2021/091738
§ 371 (c)(1),
(2) Date: Jun. 21, 2022

(87) PCT Pub. No.: WO2021/227907
PCT Pub. Date: Nov. 18, 2021

(65) Prior Publication Data
US 2023/0039774 A1    Feb. 9, 2023

(30) Foreign Application Priority Data
May 15, 2020   (CN) .......................... 202010413952.1

(51) Int. Cl.
*G06F 16/00* (2019.01)
*G06F 11/34* (2006.01)
(Continued)

(52) U.S. Cl.
CPC ...... *G06F 16/9535* (2019.01); *G06F 11/3438* (2013.01); *G06F 16/9536* (2019.01)

(58) Field of Classification Search
CPC ............... G06F 40/166; G06F 16/3331; G06F 16/9024; G06F 16/951; G06F 16/958;
(Continued)

(56) References Cited

U.S. PATENT DOCUMENTS

| 2011/0191702 A1 | 8/2011 | Lunsford |
| 2012/0197982 A1* | 8/2012 | Waher .................... G06F 9/445 709/203 |

(Continued)

FOREIGN PATENT DOCUMENTS

| CN | 102831248 A | 12/2012 |
| CN | 103064834 A | 4/2013 |

(Continued)

OTHER PUBLICATIONS

"How to Search and Comment on Trends in Backstage View of Toutiao", Yan Xiao Er's Blog: Tips for Life, May 10, 2020, pp. 1-3, https://jingyan.baidu.com/article/fdbd4277338582f99f3f484d.html.
(Continued)

*Primary Examiner* — Shyue Jiunn Hwa
(74) *Attorney, Agent, or Firm* — Astute IP Law Group

(57) ABSTRACT

Embodiments of the present disclosure provide a content creation method and a device. The method comprises: displaying a creation guide panel in response to a triggering operation on a content publishing control, wherein the creation guide panel comprises at least two creation guide themes, and creation attributes corresponding to the creation guide themes are different; and in response to a triggering operation on a target creation guide theme, displaying multiple pieces of creation guide content information corresponding to the target creation guide theme, so that a user performs content creation according to the creation guide content information, wherein the target creation guide theme is any one of the at least two creation guide themes.

(Continued)

```
┌─────────────────────────────────────────────────────────────┐
│ A creation guide panel is displayed in response to a        │
│ triggering operation on a content publishing control,       │
│ where the creation guide panel includes at least two        │── S201
│ creation guide themes corresponding to different creation   │
│ attributes                                                   │
└─────────────────────────────────────────────────────────────┘
                              │
                              ▼
┌─────────────────────────────────────────────────────────────┐
│ Multiple pieces of creation guide content information       │
│ corresponding to a target creation guide theme is           │
│ displayed in response to a triggering operation on the      │── S202
│ target creation guide theme, where the creation guide       │
│ content information is used by a user to create content,    │
│ and where the target creation guide theme is any one of     │
│ the at least two creation guide themes                      │
└─────────────────────────────────────────────────────────────┘
```

According to the embodiments of the present disclosure, the user can use the creation guide content information for content creation, and the user can determine creatable content and also can provide a content consumer with content needed by the content consumer, thereby improving content creation efficiency and experience.

18 Claims, 13 Drawing Sheets

(51) Int. Cl.
*G06F 16/9535* (2019.01)
*G06F 16/9536* (2019.01)

(58) Field of Classification Search
CPC ........ G06F 3/048; G06F 3/0482; G06F 40/14; G06F 40/143; G06F 8/34; G06F 8/38; G06F 16/3329; G06F 16/35; G06F 16/4393; G06F 16/58; G06F 16/587; G06F 16/738; G06F 16/739; G06F 16/783; G06F 18/23; G06F 18/24; G06F 40/205; G06F 40/35; G06F 9/445; G06N 20/00; G06N 3/045; G06N 5/02; G06N 5/04; G06N 7/01; G06V 10/764
See application file for complete search history.

(56) References Cited

U.S. PATENT DOCUMENTS

| | | |
|---|---|---|
| 2014/0089814 A1 | 3/2014 | Yu et al. |
| 2015/0281142 A1 | 10/2015 | Chen et al. |
| 2016/0092416 A1 | 3/2016 | Kohlmeier et al. |
| 2018/0068019 A1* | 3/2018 | Novikoff ............. G06F 16/7867 |
| 2020/0320414 A1* | 10/2020 | Neumann ................ G06N 5/04 |

FOREIGN PATENT DOCUMENTS

| | | |
|---|---|---|
| CN | 103186584 A | 7/2013 |
| CN | 103617289 A | 3/2014 |
| CN | 103955470 A | 7/2014 |
| CN | 104077320 A | 10/2014 |
| CN | 106716415 A | 5/2017 |
| CN | 109446456 A | 3/2019 |
| CN | 110245298 A | 9/2019 |
| CN | 111046281 A | 4/2020 |
| CN | 111580921 A | 8/2020 |

OTHER PUBLICATIONS

International Search Report and Written Opinion issued in International Patent Application No. PCT/CN2021/091738 on Jul. 16, 2021.

* cited by examiner

CONTENT CREATION METHOD AND DEVICE

This application is a national stage of International Application No. PCT/CN2021/091738, filed on Apr. 30, 2021, which claims priority to Chinese Patent Application No. 202010413952.1, titled "CONTENT CREATION METHOD AND DEVICE", filed on May 15, 2020 with the China National Intellectual Property Administration, both of which are incorporated herein by reference in their entireties.

FIELD

The present disclosure relates to the field of computer and network communication technology, and in particular to a content creation method and device.

BACKGROUND

With the improvement of the hardware performance of terminal devices and the continuous development of the artificial intelligence technology, more and more applications (APPs) run on the terminal devices. At present, various comprehensive content APPs that integrate the functions of creation and consumption are emerging. The creation and release of content in such APPs is an extremely important part of their ecosystem.

At present, users can publish content in the APPs. However, the existing APPs can only provide a certain type of content publishing entry to the user, and the users can create a certain type of content to be acquired by consumers.

This creation method has the following technical problems. The users cannot determine the content that can be created, thus limiting the creation process. The created content is not the content needed by content consumers, thus affecting the efficiency and experience of content publication.

SUMMARY

A content creation method and device are provided according to an embodiment of the present disclosure, in order to overcome the technical problems in the conventional technology. For example, the users cannot determine the content that is creatable by themselves, thus limiting the creation process; and the created content is not the content needed by content consumers, thus affecting the efficiency and experience of content creation.

In a first aspect, a content creation method is provided according to an embodiment of the present disclosure. The method includes:

displaying a creation guide panel in response to a triggering operation on a content publishing control, where the creation guide panel includes at least two creation guide themes corresponding to different creation attributes; and displaying multiple pieces of creation guide content information corresponding to a target creation guide theme in response to a triggering operation on the target creation guide theme, where the creation guide content information is used by a user to create content, and where the target creation guide theme is any one of the at least two creation guide themes.

In a second aspect, a content aggregation method is provided according to an embodiment of the present disclosure. The method includes:

aggregating content with a same attribute into a same event using a pre-trained model; determining a popularity of an event based on interaction data of the event within a preset time period; and generating first creation guide content information corresponding to a creation hot topic based on the event, in a case that the popularity of the event is greater than a preset popularity threshold.

In a third aspect, a content creation device is provided according to an embodiment of the present disclosure.

The device includes: a panel display unit configured to display a creation guide panel in response to a triggering operation on a content publishing control, where the creation guide panel includes at least two creation guide themes corresponding to different creation attributes; and a content display unit configured to display multiple pieces of creation guide content information corresponding to a target creation guide theme in response to a triggering operation on the target creation guide theme, where the creation guide content information is used by a user to create content, and where the target creation guide theme is any one of the at least two creation guide themes.

In a fourth aspect, a content aggregation device is provided according to an embodiment of the present disclosure.

The device includes: an event aggregation unit configured to aggregate content with a same attribute into a same event using a pre-trained model; a content generation unit configured to determine a popularity of the event based on interaction data of the event within a preset time period; and generate first creation guide content information corresponding to a creation hot topic based on the event, in a case that the popularity of the event is greater than a preset popularity threshold.

In a fifth aspect, an electronic device is provided according to an embodiment of the present disclosure. The electronic device includes: a memory and a processor.

The memory stores computer-executable instructions.

The processor is configured to execute the computer executable instructions stored in the memory, to perform the content creation method provided in the above first aspect and various possible designs of the first aspect.

In a sixth aspect, an electronic device is provided according to an embodiment of the present disclosure. The electronic device includes: a memory and a processor.

The memory stores computer executable instructions.

The processor is configured to execute the computer-executable instructions stored in the memory, to perform the content aggregation method provided in the above second aspect and various possible designs of the second aspect.

In a seventh aspect, a computer-readable storage medium is provided according to an embodiment of the present disclosure. The computer-readable storage medium stores computer executable instructions that, when executed by a processor, perform the content creation method provided in the above first aspect and various possible designs of the first aspect.

In an eighth aspect, a computer-readable storage medium is provided according to an embodiment of the present disclosure. The computer-readable storage medium stores computer executable instructions that, when executed by a processor, perform the content aggregation method provided in the above second aspect and various possible designs of the second aspect.

In a ninth aspect, a computer program product is provided according to an embodiment of the present disclosure. The computer program product includes computer program instructions that, when executed by a processor, perform the content creation method provided in the above first aspect and various possible designs of the first aspect.

In a tenth aspect, a computer program product is provided according to an embodiment of the present disclosure. The computer program product includes computer program instructions that, when executed by a processor, perform the content aggregation method provided in the above second aspect and various possible designs of the second aspect.

In an eleventh aspect, a computer program is provided according to an embodiment of the present disclosure. The computer program, when executed by a processor, performs the content creation method provided in the above first aspect and various possible designs of the first aspect.

In a twelfth aspect, a computer program is provided according to an embodiment of the present disclosure. The computer program, when executed by a processor, performs the content aggregation method provided in the above second aspect and various possible designs of the second aspect.

The content creation method and device are provided according to the embodiments. With the method, a creation guide panel is displayed in response to a triggering operation on a content publishing control. Then, in response to a triggering operation on any target creation guide theme in the creation guide panel, the multiple pieces of creation guide content information corresponding to the target creation guide theme are displayed, enabling a user to create content based on the creation guide content information. Therefore, the user can determine the creatable content, and the required content can be provided to the content consumers, thus improving the efficiency and experience of content creation.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION

In order to make the objective, technical solutions and advantages of the embodiments of the present disclosure clearer, the technical solutions in the embodiments of the present disclosure are described clearly and completely in conjunction with the drawings of the embodiments of the disclosure hereinafter. It is apparent that the described embodiments are only some rather than all embodiments of the present disclosure. Based on the embodiments of the present disclosure, all other embodiments obtained by those skilled in the art without any creative effort shall fall within the scope of protection of the present disclosure.

Figure 1:
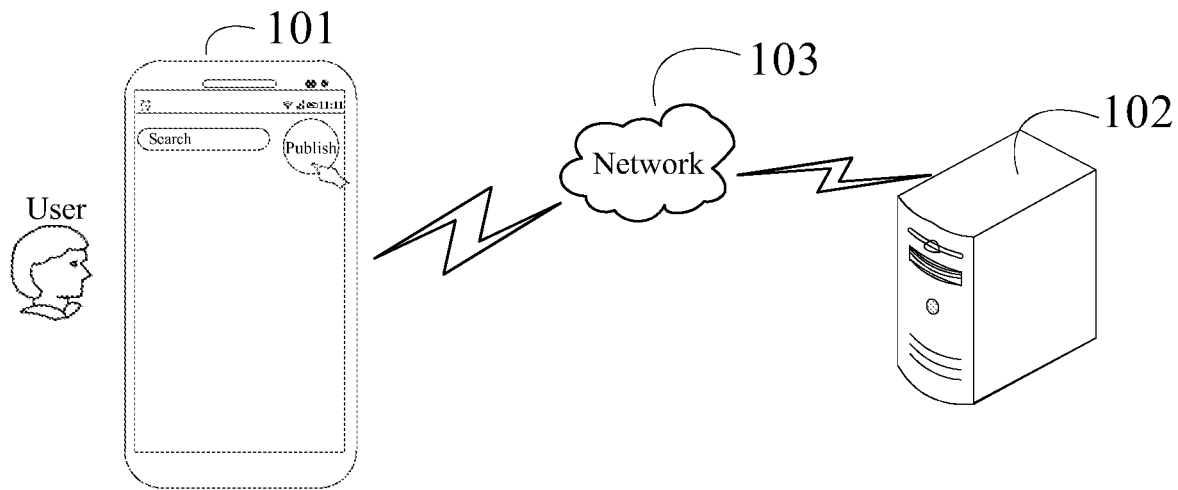
FIG. 1 is a schematic diagram of a system architecture of a content creation method according to an embodiment of the present disclosure.

Reference is made to FIG. 1 which is a schematic diagram of a system architecture of a content creation method according to an embodiment of the present disclosure. A terminal 101 and a server 102 are included in the system architecture. The terminal 101 and the server 102 can be communicatively connected through a network 103. The terminal 101 is a terminal device, and the terminal device involved in the present disclosure may be a wireless terminal or a wired terminal. A wireless terminal may be a device that provides voice and/or other service data connectivity to a user, a handheld device with a function of wireless connectivity, or other processing device connected to a wireless modem. A wireless terminal can communicate with one or more core network devices via a radio access network (RAN) and the wireless terminal may be a mobile terminal, such as a mobile phone (or referred to as a "cellular" phone) and a computer including a mobile terminal, and as an example, may be portable, pocket-sized, hand-held, computer-built-in or vehicle-mounted mobile devices that exchange language and/or data with the wireless access network. As another example, the wireless terminal may also be a device such as a personal communication service (PCS) phone, a cordless phone, a session initiation protocol (SIP) phone, or a wireless local loop (WLL) station, a personal digital assistant (PDA). The wireless terminal may also be referred to as a system, a subscriber unit, a subscriber station, a mobile station, a mobile, a remote station, a remote terminal, an access terminal, a user terminal, a user agent, and a user device or user equipment, which are not limited here. Optionally, the above-mentioned terminal device may also be a device such as a smart watch and a tablet computer. The server 102 is a server or a cluster composed of multiple servers.

Figure 2:
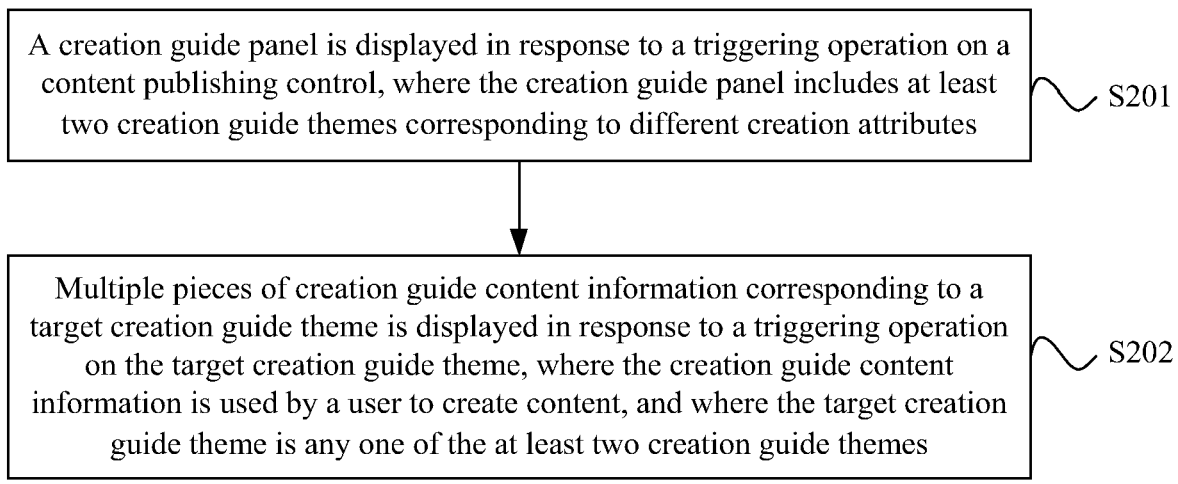
FIG. 2 is a schematic flowchart of a content creation method according to an embodiment of the present disclosure.

Reference is made to FIG. 2 which is a schematic flowchart of a content creation method according to an embodiment of the present disclosure. The method of this embodiment can be applied to the terminal shown in FIG. 1 on which a graphical user interface can be presented, and the graphical user interface has at least a content publishing control. This content creation method includes steps S201-S202.

In S201, a creation guide panel is displayed in response to a triggering operation on a content publishing control, where the creation guide panel includes at least two creation guide themes corresponding to different creation attributes.

In an embodiment of the present disclosure, the triggering operation may be a touch of a user, and may be a selection of a user by a key or a clicking of a user by a mouse.

Specifically, the creation guide panel may be displayed by floating on the page with the content publishing control or by jumping to a new page.

Each of the creation guide themes may include a main element and an accessory element. The main element is a name of the creation guide theme, and the accessory element is a title of recommended content. The creation guide theme may include at least two of "Creation hot topics", "Answering questions", "Solicit Articles" and "Local".

The creation attributes refers to attribute types of content to be created under the creation guide theme. For example, the attribute types can be current hot topics, answering questions, or local, etc. The creation attributes may be determined based on a creation popularity value under the creation guide theme. The creation popularity value may be the number of created content corresponding to the creation guide theme. For the creation attribute with a creation popularity value being less than a set popularity limit, the creation guide theme corresponding to the creation attribute will be displayed on the creation guide panel to guide the user to create. For example, for the creation guide theme with the creation attribute being "Local", if the number of corresponding created content is less, the user cannot acquire enough required content. In this case, the creation guide theme being "Local" can be displayed on the creation guide panel, thereby encouraging the users to create content.

Figure 3:
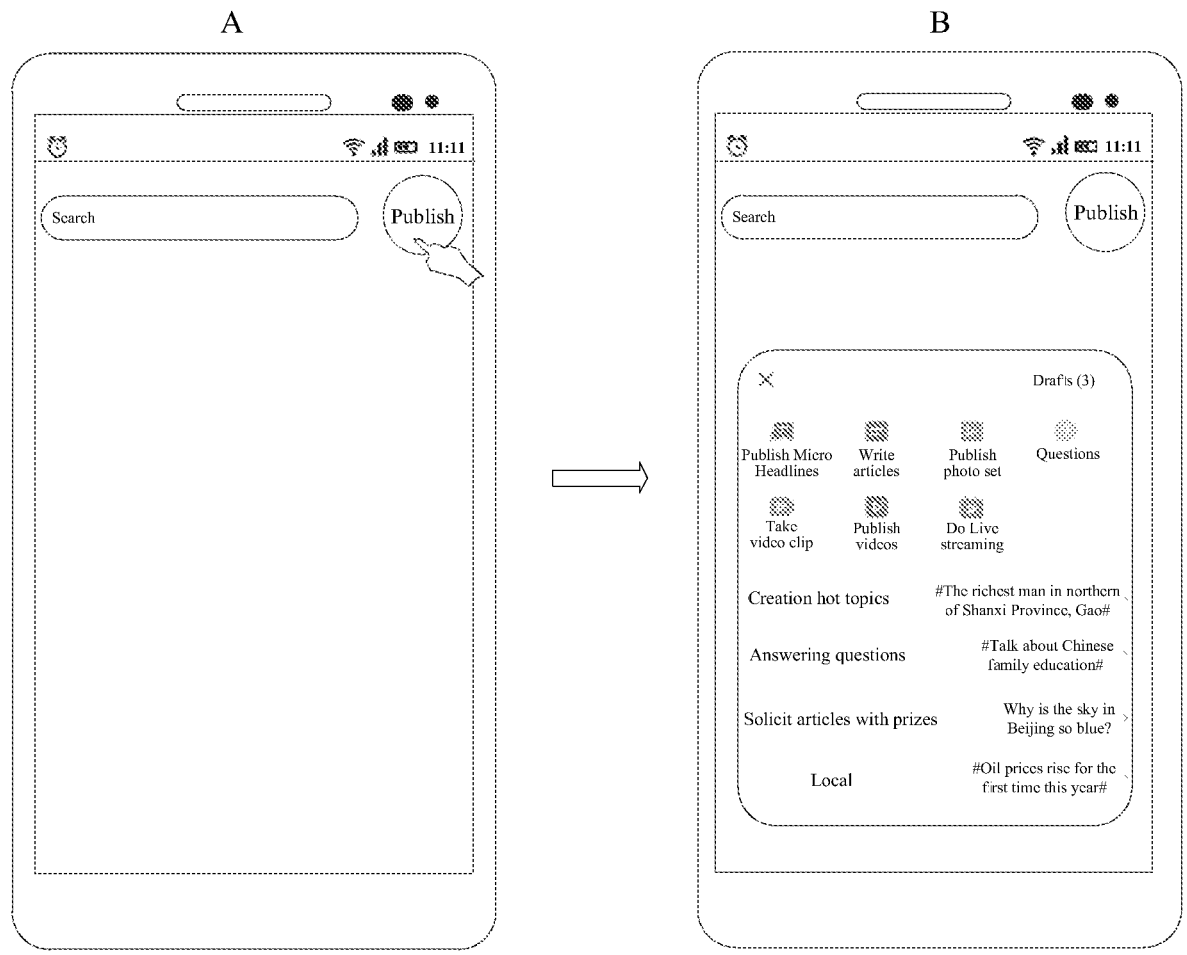
FIG. 3 is a schematic diagram of a process of displaying a creation guide panel in response to a user triggering a content publishing control according to an embodiment of the present disclosure.

FIG. 3 is a schematic diagram of a process of displaying a creation guide panel in response to a user triggering a content publishing control according to an embodiment of the present disclosure. The content publishing control can be the "Publish" button in the upper right corner of the graphical user interface. By the user clicking the "Publish" button, a creation guide panel is displayed by floating on the page with the "Publish" button. The "Creation hot topics", "Answering questions", "Calling for papers" and "Local" are displayed on the creation guide panel as the creation guide themes.

In S202, multiple pieces of creation guide content information corresponding to a target creation guide theme is displayed in response to a triggering operation on the target creation guide theme, where the creation guide content information is used by a user to create content, and where the target creation guide theme is any one of the at least two creation guide themes.

Specifically, a content request corresponding to the target creation guide theme is sent to the server, in response to the triggering operation on the target creation guide theme. Multiple pieces of creation guide content information corresponding to the target creation guide theme is received from the server and displayed.

In an embodiment of the present disclosure, each piece of the creation guide content information under the target creation guide theme is requested and obtained from the server, where each piece of the creation guide content information is obtained, by the server performing an aggregation based on multiple events. Multiple pieces of creation guide content information can be sorted in a descending or ascending order of creation popularity. For example, if the target creation guide theme is Creation hot topics, the creation guide content information is content information aggregated based on the hot topic events. If the target creation guide theme is answering questions, the creation guide content information is content of question and answer corresponding to the content of question. If the target creation guide theme is Local, the creation guide content information is content information with a regional identifier or a geographic identifier.

Recommended content of the accessory element in the creation guide theme may be one of multiple pieces of creation guide content information. For example, it may be content information with the lowest creation popularity among the multiple pieces of creation guide content information, i.e., the content information that is in great need to be created by the user.

Figure 4:
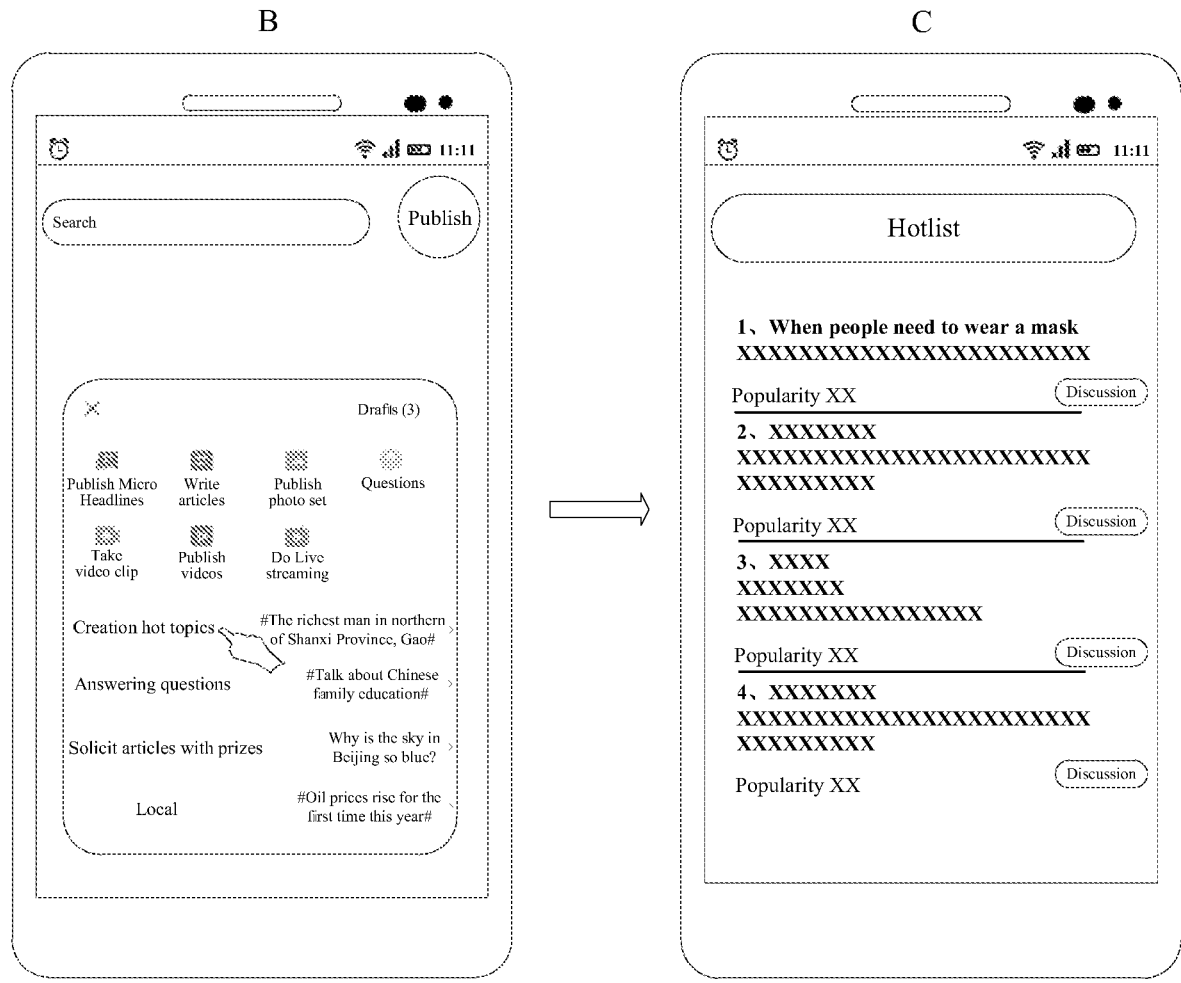
FIG. 4 is a schematic diagram of a process of switching to creation guide content information corresponding to a target creation guide theme in response to a user triggering the target creation guide theme according to an embodiment of the present disclosure.

FIG. 4 is a schematic diagram of a process of switching to creation guide content information corresponding to a target creation guide theme in response to a user triggering the target creation guide theme according to an embodiment of the present disclosure. In response to the user triggering the Creation hot topics, a hot topic content request is sent to the server. Multiple pieces of hot topic information sent are received from the server to display. Each piece of hot topic information is obtained, by the server performing an aggregation based on multiple events. The user can trigger the "Discussion" button corresponding to the hot topic information to create. In response to the user triggering "Question answering", a question request is sent to the server. Multiple questions are received from the server to display. Each question is determined by the server based on the user's historical behavior data.

As can be seen from the above description, the creation guide panel is first displayed in response to the trigger operation on the content publishing control. Then, in response to a triggering operation on any target creation guide theme in the creation guide panel, multiple pieces of creation guide content information corresponding to the target creation guide theme are displayed, enabling the user to create content using the creation guide content information. The user can determine the creatable content, and the required content can be provided to the content consumers, thus improving the efficiency and experience of content creation.

Figure 5:
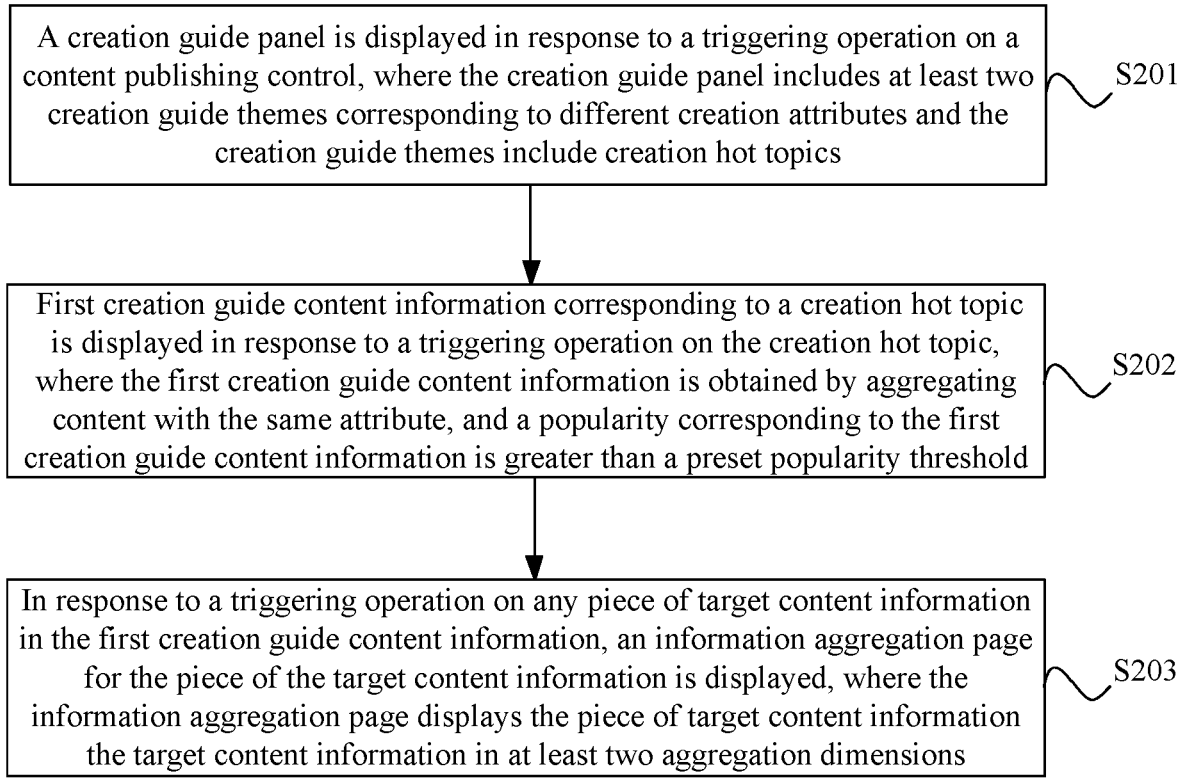
FIG. 5 is a schematic flowchart of a content creation method according to another embodiment of the present disclosure.

Reference is made to FIG. 5 which is a schematic flowchart of a content creation method according to another embodiment of the present disclosure. On the basis of the above embodiments in which the creation guide theme includes Creation hot topics, the above-mentioned step S202 may specifically include the following.

First creation guide content information corresponding to a creation hot topic is displayed in response to a triggering operation on the creation hot topic, where the first creation guide content information is obtained by aggregating content with the same attribute, and a popularity corresponding to the first creation guide content information is greater than a preset popularity threshold.

Specifically, a hot topic content request is sent to the server, in response to the triggering operation on the creation hot topic. The first creation guide content information is received from the server to display. Each piece of first creation guide content information is obtained by the server aggregating the content with the same attribute into the same event.

The popularity may be determined based on interaction data. The interaction data may include one or more of pageview, a forwarding amount, a like amount, a comment amount, and a click rate. The preset popularity threshold can be set as demand.

As shown in FIG. 4, the graphical user interface is switched to the first creation guide content information corresponding to the Creation hot topics, after the user triggers the Creation hot topics.

Correspondingly, after step 202, the method further includes step S203.

In S203, in response to a triggering operation on any piece of target content information in the first creation guide content information, an information aggregation page for the target content information is displayed, where the information aggregation page displays the target content information in at least two aggregation dimensions.

Specifically, the aggregation dimensions corresponding to at least two attribute characteristics of the target content information are determined based on the at least two attribute characteristics. The target content information is displayed in an aggregation manner in the corresponding aggregation dimensions. The attribute characteristics include: a key entity, a keyword, key content, tag content, and a popularity, etc.

In the embodiment of the present disclosure, multiple aggregation dimensions are presented on the information aggregation page.

The aggregation dimensions include: a details area, a hot topic area, a discussion area, a video area, an encyclopedia area, a picture area, a music area, etc.

For example, if certain target content information has a keyword and the popularity thereof indicates that it is a hot topic event, the certain target content information can be displayed in the aggregation manner through the three dimensions of the details area, the hot topic area and the encyclopedia area.

Figure 6:
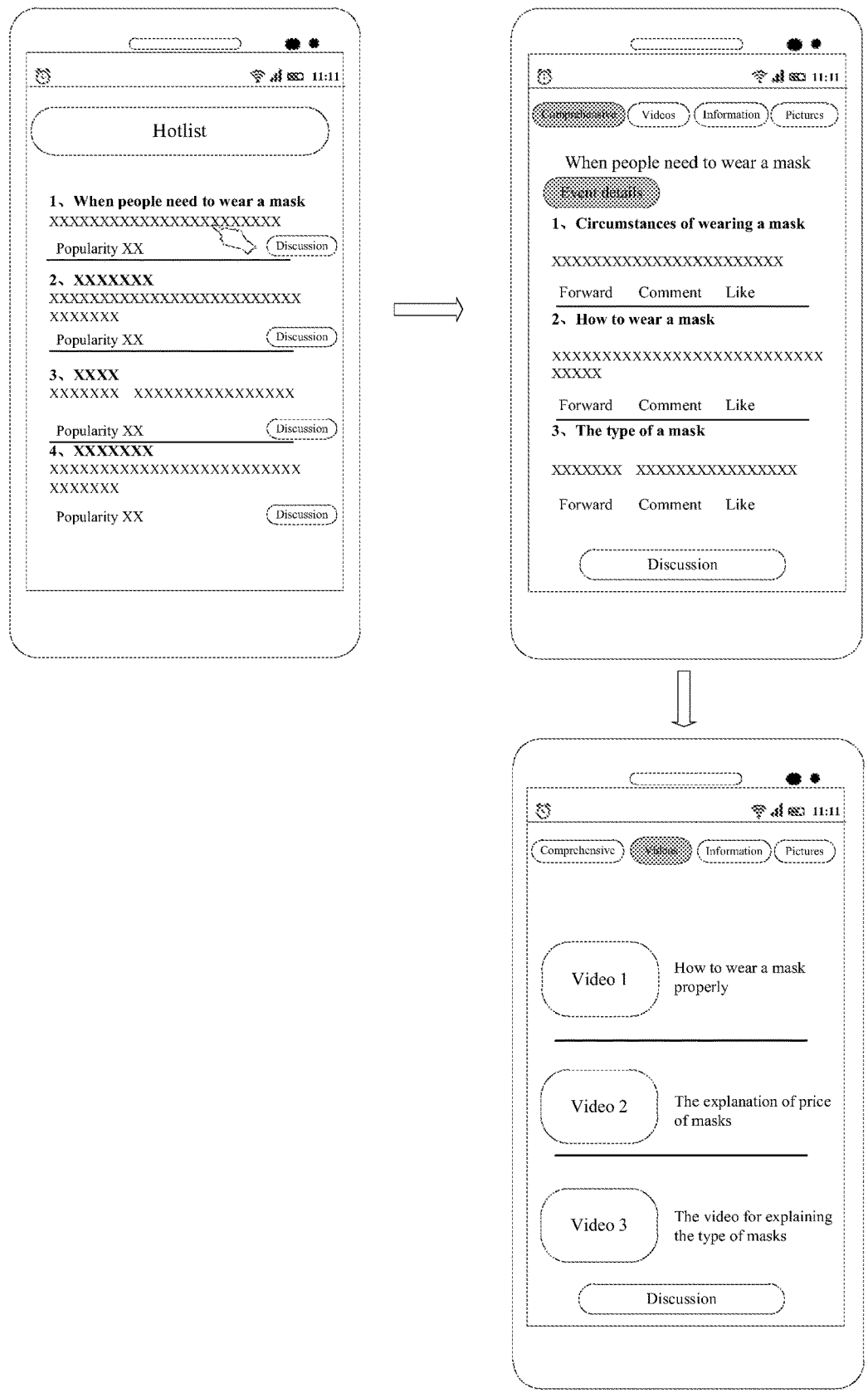
FIG. 6 is a schematic diagram of a process of switching to an information aggregation page in response to a user triggering target content information according to an embodiment of the present disclosure.

FIG. 6 is a schematic diagram of a process of switching to an information aggregation page in response to a user triggering on target content information according to an embodiment of the present disclosure. When the user triggers "When do people need to wear a mask", the aggregated target content information can be displayed through a first dimension "Event details", and can also be displayed through a second dimension "Video".

Referring to FIG. 6, in the embodiment of the present disclosure, if the user is interested in a certain piece of first creation guide content information, the user can directly trigger an entry sign "Discussion" corresponding to the first creation guide content information to start the content creation. Alternatively, the user can trigger the creation guide content information to enter the information aggregation page; and trigger an entry sign "Discussion" on the information aggregation page after browsing the hot topic event details displayed on the information aggregation page, to start the content creation.

Figure 7:
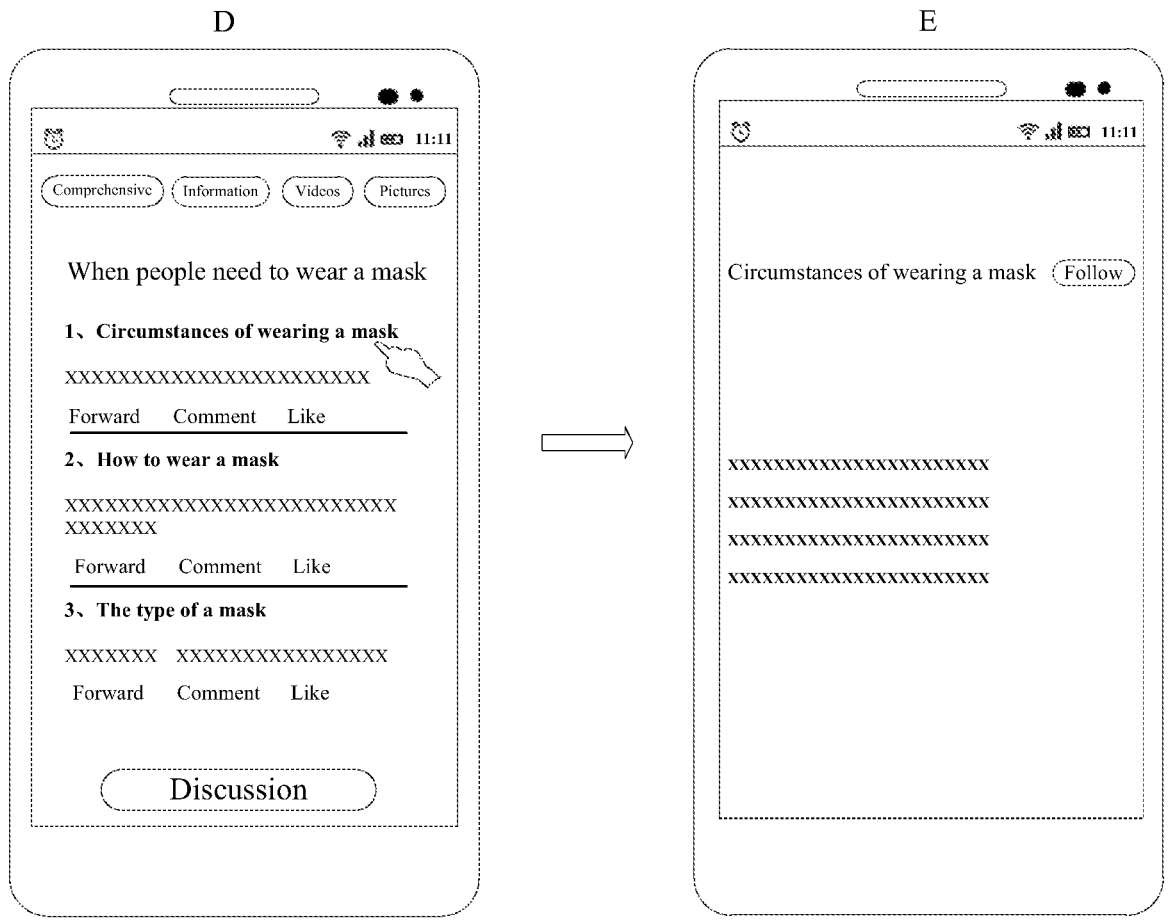
FIG. 7 is a schematic diagram of a process of switching to a details page in response to a user triggering an event in an information aggregation page according to an embodiment of the present disclosure.

It should be noted that the user may trigger any event in the event details area on the information aggregation page to enter a details page of the event, enabling the user to know more comprehensive information. FIG. 7 is a schematic diagram of a process of switching to a details page in response to a user triggering an event in an information aggregation page according to an embodiment of the present disclosure.

It can be seen from the above description that after the user triggers the creation hot topic, multiple pieces of first creation guide content information corresponding to the creation hot topic are displayed. The first creation guide content information is obtained by aggregating the content with the same attribute, which has a high popularity, so as to improve a creation interest of the user. In addition, any target content information in the first creation guide content information is triggered and an information aggregation page for the target content information is displayed, thus enabling the user to know the details of the hot topic event.

Figure 8:
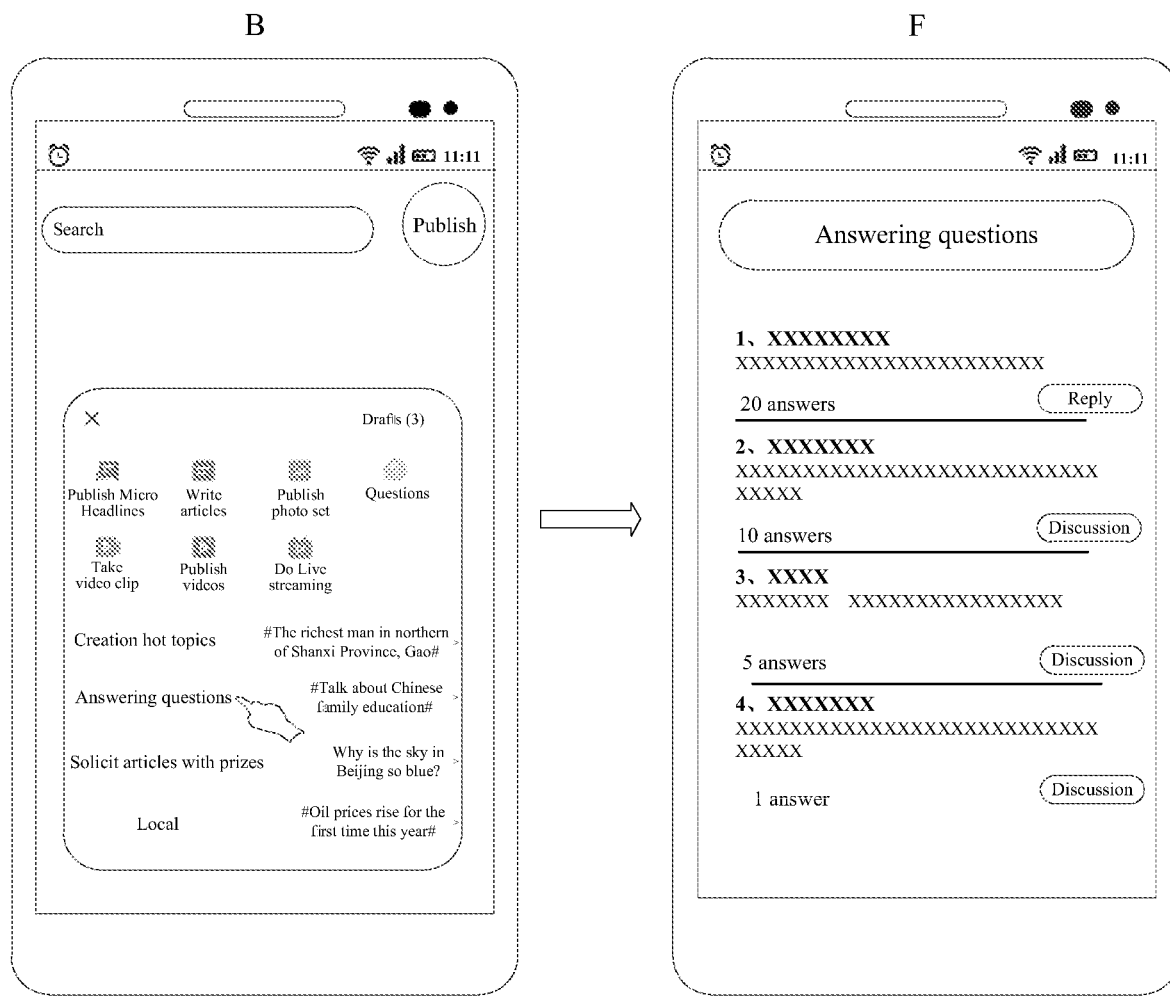
FIG. 8 is a schematic diagram of a process of switching to creation guide content information corresponding to an answering question in response to a user triggering the answering question on a creation guide panel according to an embodiment of the present disclosure.

Reference is made to FIG. 8 which is a schematic diagram of a process of switching to creation guide content information corresponding to an answering question in response to a user triggering the answering question on a creation guide panel according to an embodiment of the present disclosure. In an embodiment of the present disclosure, the above-mentioned creation guide theme includes answering question. In this case, the above-mentioned step S202 specifically includes:

acquiring creation guide content information corresponding to the answering question based on a user identifier of the user, in response to a triggering operation on the answering question; and displaying the creation guide content information corresponding to the answering question.

Specifically, a process of acquiring creation guide content information corresponding to the answering question based on the user identifier of the user includes: sending a question request carrying the user identifier to the server, based on the user identifier; and receiving multiple questions corresponding to the user identifier from the server, as the creation guide content information corresponding to the answering question. The multiple questions corresponding to the user identifier are determined by the server based on the user's historical behavior data.

It can be seen from the above description that in the embodiment, personalized questions can be pushed to the user, thereby improving user's efficiency and interest to answer questions.

Figure 9:
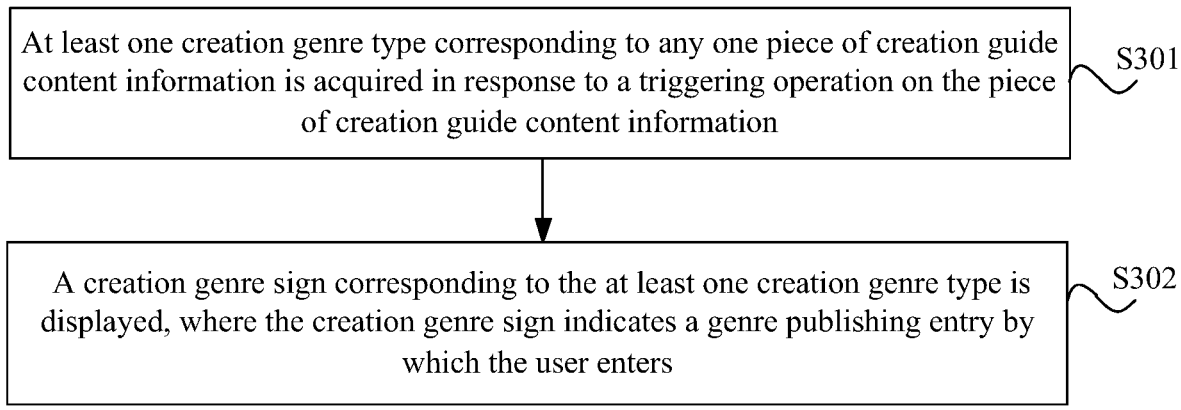
FIG. 9 is a schematic flowchart of a content creation method according to another embodiment of the present disclosure.

Reference is made to FIG. 9 which is a schematic flowchart of a content creation method according to yet another embodiment of the present disclosure. On the basis of the above embodiments, the content creation method further includes steps S301 to S302.

In S301, at least one creation genre type corresponding to any one piece of creation guide content information is acquired in response to a triggering operation on the piece of creation guide content information.

In S302, a creation genre sign corresponding to the at least one creation genre type is displayed, and the creation genre sign indicates a genre publishing entry by which the user enters.

In the embodiment of the present disclosure, the creation genre type includes, but are not limited to, "Micro headlines", "Videos", "Live streams", and so on. Each genre corresponds to a genre publishing entry. The genre release entry includes "Publish Micro Headlines", "Publish Videos" and "Do Live streams".

Figure 10:
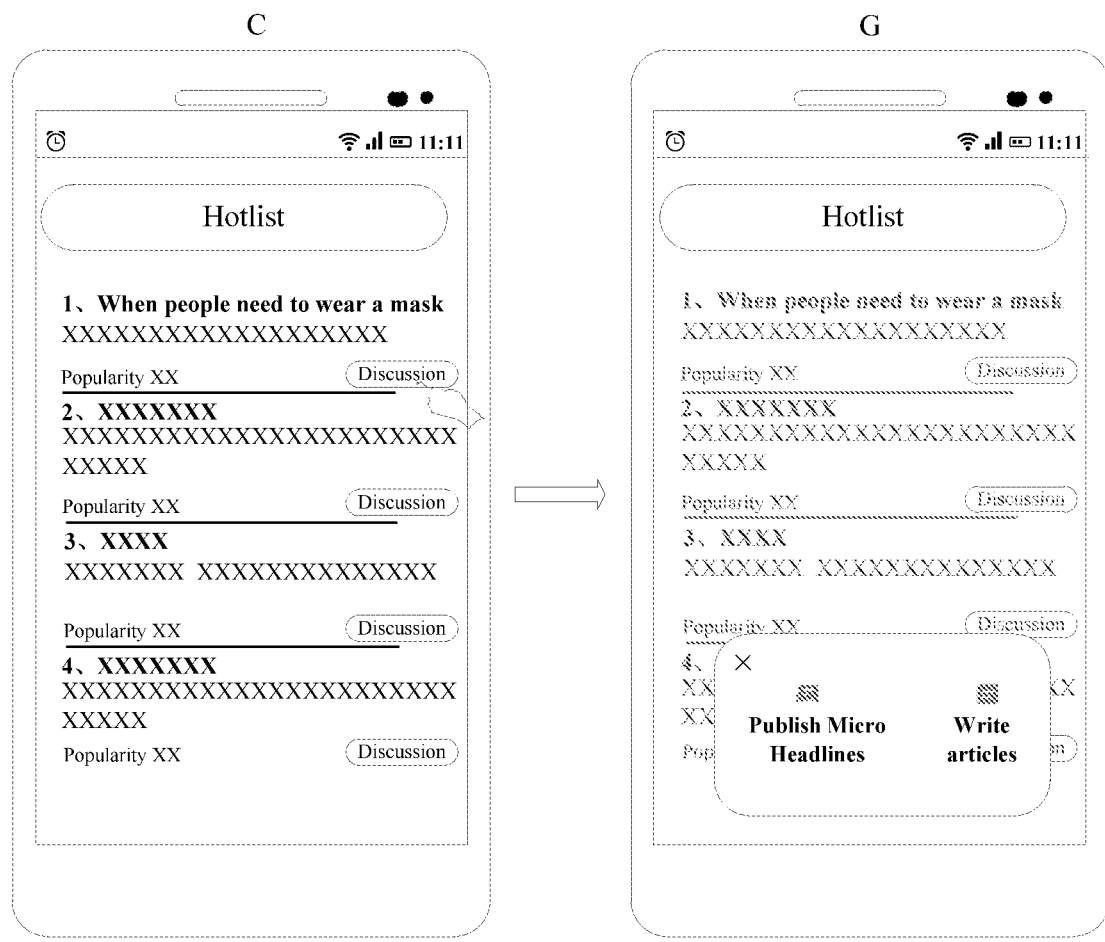
FIG. 10 is a schematic diagram of a process of switching to a creation genre sign selection page in response to a user triggering an entry sign of "Discussion" on a page with creation guide content information according to an embodiment of the present disclosure.

FIG. 10 is a schematic diagram of a process of switching to a creation genre sign selection page in response to a user triggering an entry sign of "Discussion" on a page with creation guide content information according to an embodiment of the present disclosure.

Figure 11:
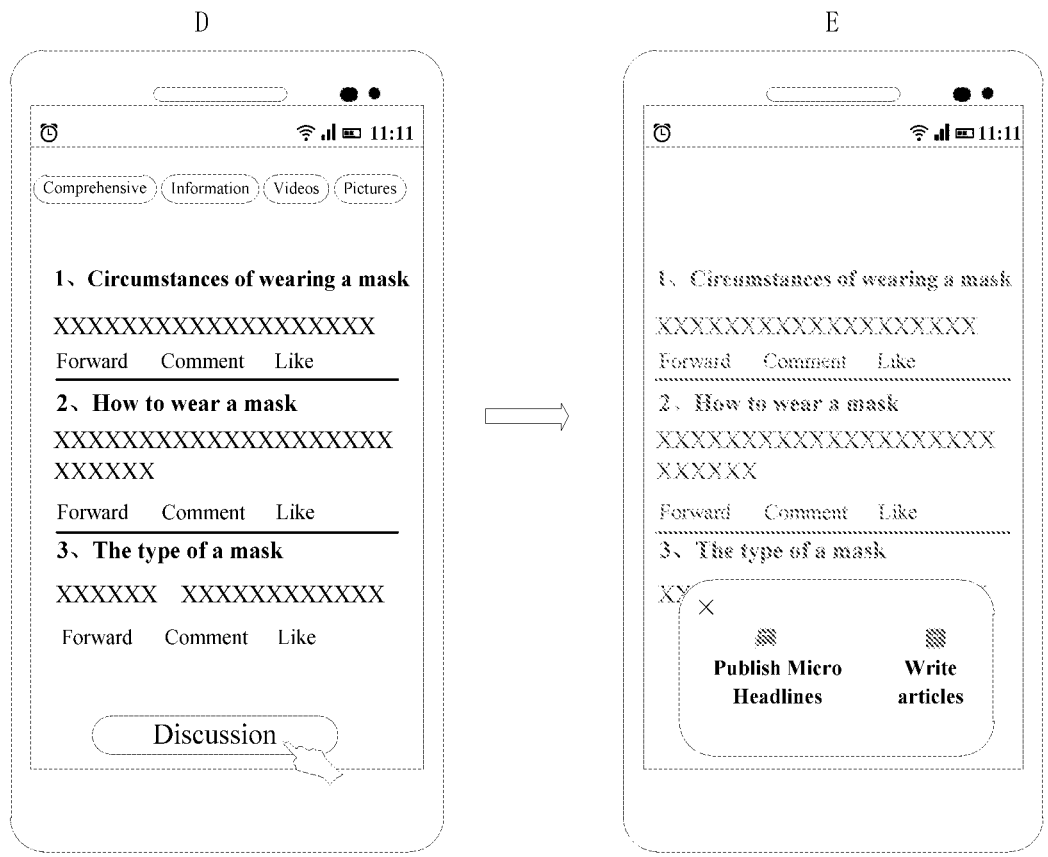
FIG. 11 is a schematic diagram of a process of switching to a creation genre sign selection page in response to a user triggering an entry sign of "Discussion" on an information aggregation page according to an embodiment of the present disclosure.

FIG. 11 is a schematic diagram of a process of switching to a creation genre sign selection page in response to a user triggering an entry sign of "Discussion" on an information aggregation page according to an embodiment of the present disclosure.

It can be seen from the above description that when a user creates content based on a guidance of the creation guide content information, the user can select a creation genre type to enter the corresponding genre publishing entry, so as to create content in a desired genre.

Figure 12:
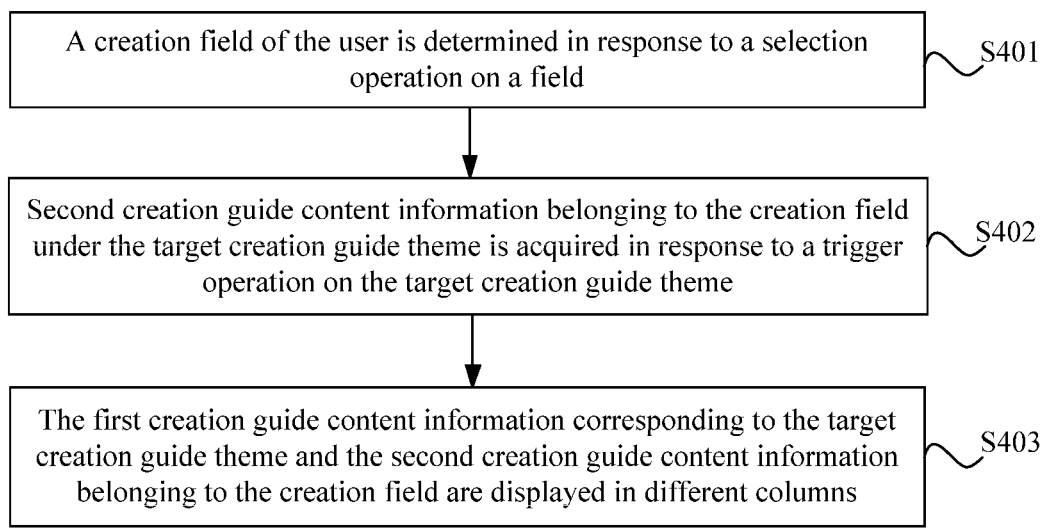
FIG. 12 is a schematic flowchart of a content creation method according to another embodiment of the present disclosure.

Reference is made to FIG. 12 which is a schematic flowchart of a content creation method according to another embodiment of the present disclosure. On the basis of the above embodiments, the content creation method further includes steps S401 to S403.

In S401, a creation field of the user is determined in response to a selection operation on a field.

Specifically, a field addition panel is displayed in response to the user triggering the field addition control. The user's creation field button is displayed on the page with the field addition control, in response to the user triggering the field to be added.

The field addition panel may be displayed by floating on the page with the field addition control or by switching to a new page.

The user's creation field may include Entertainment, Parenting, Sports, and Pets, and so on.

In S402, second creation guide content information belonging to the creation field under the target creation guide theme is acquired in response to a trigger operation on the target creation guide theme.

Specifically, a request for second creation guide content information is sent to the server, in response to the triggering operation on the target creation guide theme. The second creation guide content information is received from the server. The second creation guide content information may be obtained, by the server performing an aggregation based on the events; or may be determined based on the user's historical behavior data.

In S403, the first creation guide content information corresponding to the target creation guide theme and the second creation guide content information belonging to the creation field are displayed in different columns.

In an embodiment of the present disclosure, the page with the field addition control has a real-time hot topic button corresponding to the first creation guide content information.

Specifically, the first creation guide content information and the second creation guide content information are displayed in different columns in response to a user triggering of switching between the real-time hot topic button and the creation field button.

The first creation guide content information and the second creation guide content information may be sorted based on the interaction data, for example, in a descending order of the interaction data.

The sorts of the first creation guide content information and the second creation guide content information are updated based on the popularity in a preset time period.

Figure 13:
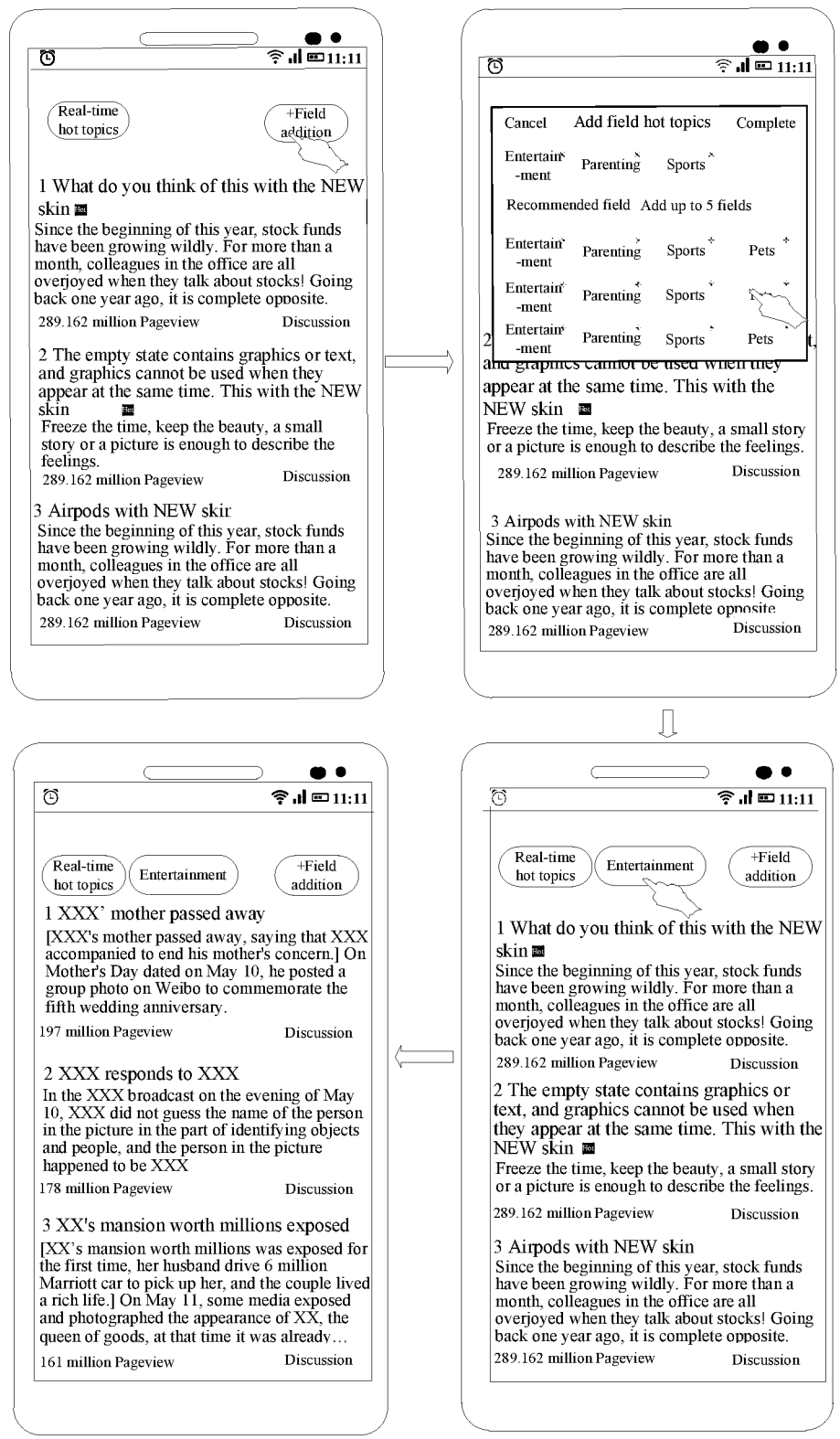
FIG. 13 is a schematic diagram of a process of displaying second creation guide content information corresponding to a creation field according to an embodiment of the present disclosure.

FIG. 13 is a schematic diagram of a process of displaying second creation guidance content information corresponding to the creation field according to an embodiment of the present disclosure. In response to the user triggering "Field addition", the user's creation field may be determined as "Entertainment". In response to the user triggering the "Entertainment" field hot topic, the second creation guide content information corresponding to "Entertainment", i.e., the entertainment hot topic information, is acquired. The real-time hot topic information and entertainment hot topic information are displayed in different columns.

As can be seen from the above description, the creation field is added and the first creation guide content information and the second creation guide content information are displayed in different columns. The first creation guide content information and the second creation guide content information corresponding to the creation field can be displayed for the user by switching. The content information of the user interest field can be quickly determined, and the displayed content information can be used to create by the user.

Figure 14:
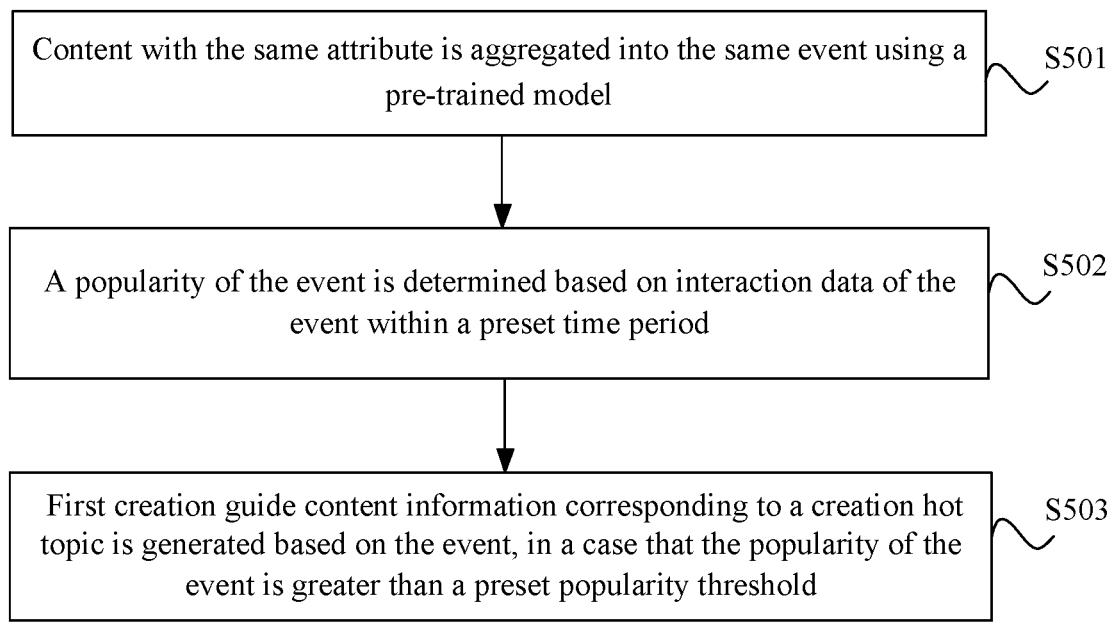
FIG. 14 is a schematic flowchart of a content aggregation method according to an embodiment of the present disclosure.

Reference is made to FIG. 14 which is a schematic flowchart of a content aggregation method according to an embodiment of the present disclosure. This method is applicable to the server shown in FIG. 1. The content aggregation method includes steps S501 to S503.

In S501, content with the same attribute is aggregated into the same event using a pre-trained model.

Specifically, the events in the whole network are acquired and inputted into the pre-trained model. The processing process of the model includes: extracting attribute text information in content of each event, converting the attribute text information into feature vectors, calculating a cosine of an angle between the feature vectors of every two events to obtain a similarity between the two events, and determining events with a similarity exceeding a preset similarity threshold as the same event.

The attribute can be one or more of a body text, a title, a keyword and a tag of the content.

In S502, a popularity of the event is determined based on interaction data of the event within a preset time period.

The interaction data may be one or more of pageview, a forwarding amount, a like amount, a comment amount, and a click rate. Specifically, a value of one item of interaction data can be used as the popularity of the event. Alternatively, multiple items of interaction data can be inputted into a popularity model to calculate a popularity of the event.

In S503, first creation guide content information corresponding to a creation hot topic is generated based on the event, in a case that the popularity of the event is greater than a preset popularity threshold.

Specifically, the first creation guide content information is sorted based on the popularity to obtain the first creation guide content information corresponding to the creation hot topic. In an embodiment, the first creation guide content information is sorted in an ascending order of the popularity.

As can be seen from the above description, the event is obtained by aggregating the content with the same attribute.

The first creation guide content information corresponding to the creation hot topic is generated based on the popularity of the event, thus enabling to provide the user with hot topic event and increasing user's creation interest.

After generating the first creation guide content information corresponding to the creation hot topic in step S503, the method further includes: updating the popularity of the event in a preset time period, and updating the generated first creation guide content information corresponding to the creation hot topic based on the updated popularity, to ensure that the information in the first creation guide content information is the latest hot topic event.

In an embodiment of the present disclosure, on the basis of the above-mentioned embodiments, the content aggregation method further includes: acquiring historical behavior data of the user, performing information aggregation on the historical behavior data, determining characteristic information of the user; and selecting multiple questions from a pre-stored question database as creation guide content information corresponding to answering question based on the characteristic information.

Specifically, multiple behavior keywords with a usage frequency exceeding a preset frequency threshold in the historical behavior data are extracted based on the user's historical behavior data. The same or similar behavior keywords are aggregated using a semantic model to obtain the user's characteristic information. The questions related to the characteristic information are queried based on the characteristic information as the creation guide content information corresponding to the answering question.

The user's historical behavior data includes one or more of search data, click data, follow-add data, and comment data.

The questions related to the characteristic information refer to questions having a keyword corresponding to the characteristic information.

It can be seen from the above description that the creation guide content information corresponding to the answering question is generated based on the user's historical behavior data, so as to display the user's interested questions to the user and improve the user's creation interest.

Figure 15:
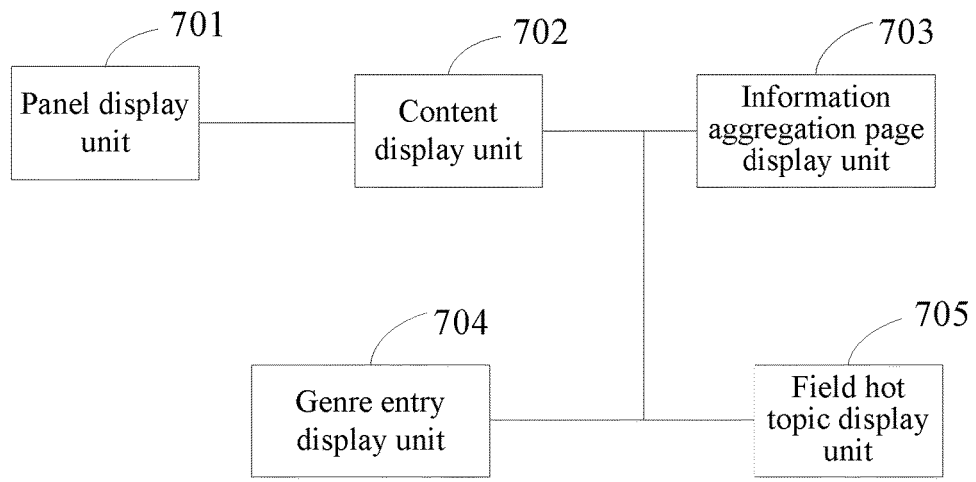
FIG. 15 is a structural block diagram of a content creation device according to an embodiment of the present disclosure.

In correspondence with the content creation method according to the above embodiments, FIG. 15 is a structural block diagram of a content creation device according to an embodiment of the present disclosure. For convenience of explanation, only the parts related to the embodiment of the present disclosure are shown. With reference to FIG. 15, the content creation device 70 includes a panel display unit 701 and a content display unit 702.

The panel display unit 701 is configured to display a creation guide panel in response to a triggering operation on a content publishing control, where the creation guide panel includes at least two creation guide themes corresponding to different creation attributes.

A content display unit 702 configured to display multiple pieces of creation guide content information corresponding to a target creation guide theme in response to a triggering operation on the target creation guide theme, where the creation guide content information is used by a user to create content, and the target creation guide theme is any one of the at least two creation guide themes.

In an embodiment of the present disclosure, the content display unit 702 is specifically configured to display first creation guide content information corresponding to a creation hot topic in response to a triggering operation on the creation hot topic, where the first creation guide content information is obtained by aggregating content with the same attribute, and a popularity corresponding to the first creation guide content information is greater than a preset popularity threshold.

The content creation device 70 further includes: an information aggregation page display unit 703.

The information aggregation page display unit 703 is configured to display, in response to a triggering operation on one piece of target content information in the first creation guide content information, an information aggregation page for the piece of target content information, where the information aggregation page displays the piece of target content information in at least two aggregation dimensions.

In an embodiment of the present disclosure, the content display unit 702 is further configured to acquire, in response to a triggering operation on an answering question, creation guide content information corresponding to the answering question based on a user identifier of the user, and display the creation guide content information corresponding to the answering question.

In an embodiment of the present disclosure, the content creation device 70 further includes: a genre entry display unit 704.

The genre entry display unit 704 is configured to acquire, in response to a triggering operation on one piece of creation guide content information, at least one creation genre type corresponding to the piece of creation guide content information; and display a creation genre sign corresponding to the at least one creation genre type, where the creation genre sign indicates a genre publishing entry by which the user enters In an embodiment of the present disclosure, the content creation device 70 further includes: a field hot topic display unit 705, configured to determine a creation field of the user in response to a selection operation on a field; acquire second creation guide content information belonging to the creation field under the target creation guide theme, in response to the trigger operation on the target creation guide theme; and display the first creation guide content information corresponding to the target creation guide theme and the second creation guide content information belonging to the creation field in different columns.

The content creation device according to the embodiment can be used to implement the technical solutions of the above method embodiments, and the implementation principles and technical effects thereof are similar, and details are not described repeatedly herein in this embodiment.

Figure 16:
FIG. 16 is a structural block diagram of a content aggregation device according to an embodiment of the present disclosure.

In correspondence with the content aggregation method in the above embodiments, FIG. 16 is a structural block diagram of a content aggregation device according to an embodiment of the present disclosure. For convenience of explanation, only the parts related to the embodiment of the present disclosure are shown. With reference to FIG. 16, the content aggregation device 80 includes an event aggregation unit 801 and a content generation unit 802.

The event aggregation unit 801 is configured to aggregate content with the same attribute into the same event using a pre-trained model.

The content generation unit 802 is configured to determine a popularity of the event based on interaction data of the event within a preset time period; and generate the first creation guide content information corresponding to a creation hot topic based on the event, in the case that the popularity of the event is greater than a preset popularity threshold.

In an embodiment of the present disclosure, the content generation unit 802 is further configured to determine a creation field of the user in response to a selection operation on a field; acquire second creation guide content information belonging to the creation field under a target creation guide theme in response to a trigger operation on the target creation guide theme; and display the first creation guide content information corresponding to the target creation guide theme and the second creation guide content information belonging to the creation field in different columns.

The content aggregation device according to the embodiment can be used to implement the technical solutions of the above method embodiments, and the implementation principles and technical effects thereof are similar, and details are not described repeatedly herein in this embodiment.

In order to implement the above embodiments, an electronic device is further provided according to the embodiment of the present disclosure.

Figure 17:
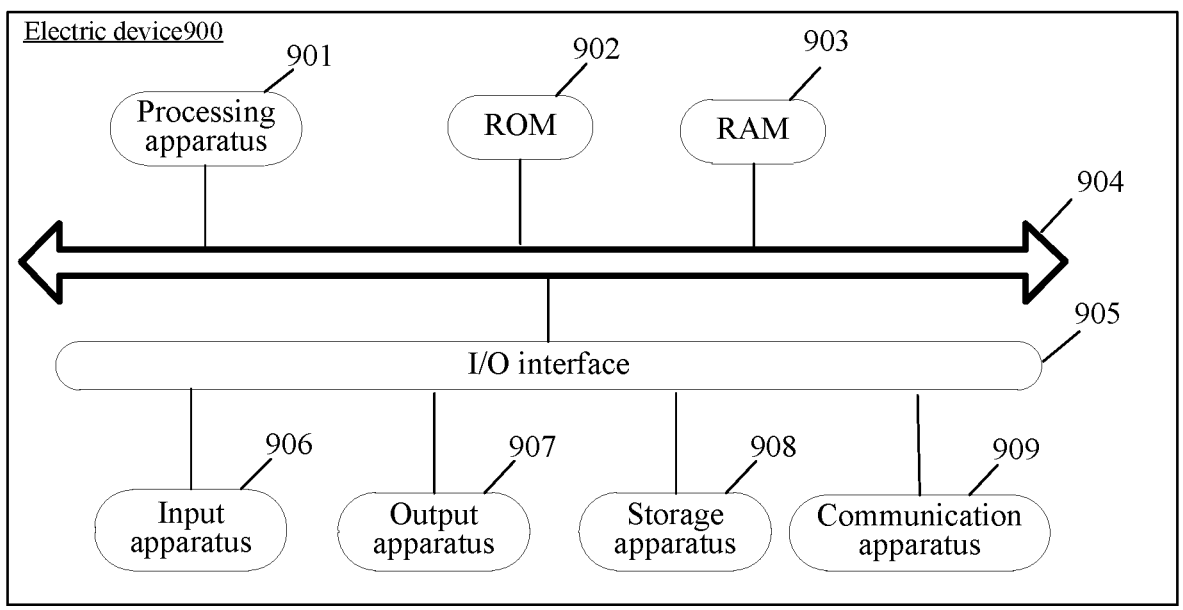
FIG. 17 is a schematic diagram of a hardware structure of an electronic device according to an embodiment of the present disclosure.

Reference is made to FIG. 17 which shows a schematic structural diagram of an electronic device 900 suitable for implementing the embodiments of the present disclosure. The electronic device 900 may be a terminal device or a server. The terminal device may include but not limited to mobile terminals such as a mobile phone, a notebook computer, a digital broadcast receiver, a personal digital assistance (PDA), a portable android device (PAD), a portable multi-media player (PMP) and a vehicle terminal (such as a vehicle navigation terminal); and fixed terminals such as digital TV and a desktop computer. The electronic device shown in FIG. 17 is exemplary, and is not intended to limit functions and scope of the embodiments of the present disclosure.

As shown in FIG. 17, the electronic device 900 may include a processing apparatus (such as a central processor and a graphic processor) 901. The processing apparatus may perform various appropriate actions and processing by executing programs stored in a read-only memory (ROM) 902 or programs uploaded from a storage apparatus 908 to a random access memory (RAM) 903. Various programs and data required for operations of the electronic device 900 are also stored in the RAM 903. The processing apparatus 901, the ROM 902 and the RAM 903 are connected to each other through the bus 904. An input/output (I/O) interface 905 is also connected to the bus 904.

Generally, the following components are connected to the I/O interface 905: an input apparatus 906 such as a touch screen, a touch panel, a keyboard, a mouse, a camera, a microphone, an accelerometer, and gyroscope; an output apparatus 907 such as a liquid crystal display (LCD), a loudspeaker and a vibrator; a storage apparatus 908 such as a magnetic tape and a hard disk; and a communication apparatus 909. The communication apparatus 909 may allow the electronic device 900 to communicate with other device in a wired or wireless manner to exchange data. Although FIG. 17 shows the electronic device 900 provided with various apparatuses, it should be understood that not all shown apparatuses are necessary. Alternatively, more or less apparatuses may be included.

According to the embodiments of the present disclosure, a process described referring to the flowchart above may be implemented by computer software programs. For example, according to an embodiment of the present disclosure, a computer program product including computer program carried on a non-transitory computer readable medium is provided. The computer program includes program codes for performing the method shown in the flowchart. In such embodiment, the computer program may be downloaded and installed from the network through the communication apparatus 909, installed from the storage apparatus 908 or installed from the ROM 902. The computer program, when executed by the processing apparatus 901, performs functions defined in the methods described in the embodiments of the present disclosure. According to an embodiment of the present disclosure, a computer program is provided. The computer program, when executed on the electric device, performs functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be any tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code embodied in the computer readable medium may be transmitted via any appropriate medium, including but not limited to an electric wire, an optical fiber, radio frequency (RF) or any appropriate combination thereof.

The computer readable storage medium may be included in the electronic device, or the computer readable storage medium may be independent from the electronic device, i.e., not being installed in the electronic device.

The computer readable medium carries one or more programs. When the one or more programs are executed by the electronic device, the electronic device is instructed to perform the methods according to the above embodiments.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instruction(s) for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware-based system for performing specified functions or operations, or may be implemented by a combination of dedicated hardware and computer instructions.

Units involved in the embodiments of the present disclosure may be implemented by software or hardware. Names of the units do not limit the units in a certain case. For example, the first acquisition unit may be described as "a unit acquiring at least two Internet Protocol addresses".

The functions described above herein may be at least partially performed by one or more hardware logic components. For example, the hardware logic components may include but not limited to: a field programmable gate array (FPGA), an application specific integrated circuit (ASIC), an application specific standard product (ASSP), a system on chip (SOC), a complex programmable logic device (CPLD) and so on.

It the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims.

The invention claimed is:

1. A content creation method, comprising:
displaying a creation guide panel in response to a triggering operation on a content publishing control, wherein the creation guide panel comprises at least two creation guide themes corresponding to different creation attributes;
sending a content request corresponding to a target creation guide theme to a server, in response to a triggering operation on the target creation guide theme, wherein the target creation guide theme is any one of the at least two creation guide themes;
receiving a plurality of pieces of creation guide content information corresponding to the target creation guide theme from the server, wherein each of the plurality of pieces of creation guide content information is acquired by the server performing an aggregation on a plurality of events in response to the content request; and
displaying the plurality of pieces of creation guide content information, wherein the creation guide content information is used by a user to create content,
wherein the creation guide theme comprises a creation hot topic, and the displaying the plurality of pieces of creation guide content information comprises:
displaying first creation guide content information corresponding to the creation hot topic in response to a triggering operation on the creation hot topic, wherein the first creation guide content information is acquired by aggregating content with a same attribute, and a popularity corresponding to the first creation guide content information is greater than a preset popularity threshold.

2. The content creation method according to claim 1, wherein
the content creation method further comprising:
displaying, in response to a triggering operation on one piece of target content information in the first creation guide content information, an information aggregation page for the piece of target content information, wherein the information aggregation page displays the piece of target content information in at least two aggregation dimensions.

3. The content creation method according to claim 1, wherein the creation guide theme comprises answering question, and the displaying a plurality of pieces of creation guide content information corresponding to a target creation guide theme in response to a triggering operation on the target creation guide theme comprises:
acquiring, in response to a triggering operation on the answering question, creation guide content information corresponding to the answering question based on a user identifier of the user;
and displaying the creation guide content information corresponding to the answering question.

4. The content creation method according to claim 1, further comprising:
acquiring, in response to a triggering operation on one piece of creation guide content information, at least one creation genre type corresponding to the piece of creation guide content information; and
displaying a creation genre sign corresponding to the at least one creation genre type, wherein the creation genre sign indicates a genre publishing entry by which the user enters.

5. The content creation method according to claim 1, further comprising:
determining a creation field of the user in response to a selection operation on a field;
acquiring second creation guide content information belonging to the creation field under the target creation guide theme, in response to the trigger operation on the target creation guide theme; and
displaying the first creation guide content information corresponding to the target creation guide theme and the second creation guide content information belonging to the creation field in different columns.

6. A content acquisition method, comprising:
receiving a content request, wherein the content request is generated by a terminal in response to a triggering operation on a target creation guide theme, and wherein the target creation guide theme comprises any one of at least two creation guide themes corresponding to different creation attributes;
acquiring a plurality of pieces of creation guide content information corresponding to the target creation guide theme by performing an aggregation on a plurality of events, in response to the content request; and
sending the plurality of pieces of creation guide content information corresponding to the target creation guide theme to the terminal, wherein the plurality of pieces of creation guide content information corresponding to the target creation guide theme is displayed by the terminal,
wherein the creation guide theme comprises a creation hot topic, and the method further comprises:
aggregating content with a same attribute into a same event using a pre-trained model;
determining a popularity of the event based on interaction data of the event within a preset time period; and
generating first creation guide content information corresponding to the creation hot topic based on the event, in a case that the popularity of the event is greater than a preset popularity threshold.

7. The content acquisition method according to claim 6, wherein the creation guide theme comprises answering question, and the method further comprises:
acquiring historical behavior data of a user, performing information aggregation on the historical behavior data, and determining characteristic information of the user; and
selecting a plurality of questions from a pre-stored question database as creation guide content information corresponding to the answering question based on the characteristic information.

8. A content creation device, comprising:
a memory storing computer-executable instructions; and
a processor,
wherein the computer-executable instructions, when executed by the processor, causes the processor to:
display a creation guide panel in response to a triggering operation on a content publishing control, wherein the creation guide panel comprises at least two creation guide themes corresponding to different creation attributes;
send a content request corresponding to a target creation guide theme to a server, in response to a triggering operation on the target creation guide theme, wherein the target creation guide theme is any one of the at least two creation guide themes;
receive a plurality of pieces of creation guide content information corresponding to the target creation guide theme from the server, wherein each of the plurality of pieces of creation guide content information is acquired by the server performing an aggregation on a plurality of events content request; and
display the plurality of pieces of creation guide content information corresponding to a target creation guide theme, wherein the creation guide content information is used by a user to create content,
wherein the creation guide theme comprises a creation hot topic, and the computer-executable instructions, when executed by the processor, cause the processor to:
display first creation guide content information corresponding to the creation hot topic in response to a triggering operation on the creation hot topic, wherein the first creation guide content information is acquired by aggregating content with a same attribute, and a popularity corresponding to the first creation guide content information is greater than a preset popularity threshold.

9. The content creation device according to claim 8, wherein the computer-executable instructions, when executed by the processor, causes the processor to:
display, in response to a triggering operation on one piece of target content information in the first creation guide content information, an information aggregation page for the piece of target content information, wherein the information aggregation page displays the piece of target content information in at least two aggregation dimensions.

10. The content creation device according to claim 8, wherein the creation guide theme comprises answering question, and the computer-executable instructions, when executed by the processor, cause the processor to:
acquire, in response to a triggering operation on the answering question, creation guide content information corresponding to the answering question based on a user identifier of the user;
and display the creation guide content information corresponding to the answering question.

11. The content creation device according to claim 8, wherein the computer-executable instructions, when executed by the processor, cause the processor to:
acquire, in response to a triggering operation on one piece of creation guide content information, at least one creation genre type corresponding to the piece of creation guide content information; and display a creation genre sign corresponding to the at least one creation genre type, wherein the creation genre sign indicates a genre publishing entry by which the user enters.

12. The content creation device according to claim 8, wherein the computer-executable instructions, when executed by the processor, cause the processor to:
determine a creation field of the user in response to a selection operation on a field;
acquire second creation guide content information belonging to the creation field under the target creation guide theme, in response to the trigger operation on the target creation guide theme; and
display the first creation guide content information corresponding to the target creation guide theme and the second creation guide content information belonging to the creation field in different columns.

13. A content acquisition device, comprising:
a memory storing computer-executable instructions; and
a processor,
wherein the computer-executable instructions, when executed by the processor, causes the processor to:
receive a content request, wherein the content request is generated by a terminal in response to a triggering operation on a target creation guide theme, and wherein the target creation guide theme comprises any one of at least two creation guide themes corresponding to different creation attributes;
acquire a plurality of pieces of creation guide content information corresponding to the target creation guide theme in response to the content request by performing an aggregation on a plurality of events; and
send the plurality of pieces of creation guide content information corresponding to the target creation guide theme to the terminal, wherein the plurality of pieces of creation guide content information corresponding to the target creation guide theme is displayed by the terminal,
wherein the creation guide theme comprises a creation hot topic, and the computer-executable instructions, when executed by the processor, cause the processor to:
aggregate content with a same attribute into a same event using a pre-trained model;
determine a popularity of the event based on interaction data of the event within a preset time period; and
generate first creation guide content information corresponding to the creation hot topic based on the event, in a case that the popularity of the event is greater than a preset popularity threshold.

14. The content acquisition device according to claim 13, wherein the creation guide theme comprises answering question, and the computer-executable instructions, when executed by the processor, cause the processor to:
acquire historical behavior data of a user, performing information aggregation on the historical behavior data, and determining characteristic information of the user; and
select a plurality of questions from a pre-stored question database as creation guide content information corresponding to the answering question based on the characteristic information.

15. A non-transitory computer-readable storage medium storing computer-executable instructions, wherein the computer-executable instructions, when executed by a processor, perform the content creation method according to claim 1.

16. A non-transitory computer-readable storage medium storing computer-executable instructions, wherein the computer-executable instructions, when executed by a processor, perform the content acquisition method according to claim 6.

17. A computer program product, comprising computer program instructions stored in a non-transitory computer readable storage medium, wherein the computer-executable instructions, when executed by a processor, perform the content creation method according to claim 1.

18. A computer program product, comprising computer program instructions stored in a non-transitory computer readable storage medium, wherein the computer-executable instructions, when executed by a processor, perform the content acquisition method according to claim 6.

* * * * *